United States Patent [19]

Hughes

[11] Patent Number: 5,089,191
[45] Date of Patent: Feb. 18, 1992

[54] PROCESS FOR MANUFACTURING A PADDED ELEMENT

[75] Inventor: Ian L. Hughes, Windsor, Canada

[73] Assignee: Woodbridge Foam Corporation, Ontario, Canada

[21] Appl. No.: 562,924

[22] Filed: Aug. 6, 1990

Related U.S. Application Data

[63] Continuation-in-part of Ser. No. 500,080, Mar. 28, 1990, abandoned.

[51] Int. Cl.$^5$ .............................................. B29C 67/22
[52] U.S. Cl. .................... 264/46.5; 264/46.6; 264/46.7
[58] Field of Search ............... 264/46.7, 46.4, 46.5, 264/46.6, 46.8; 156/79

[56] References Cited

U.S. PATENT DOCUMENTS

| | | | |
|---|---|---|---|
| 3,264,382 | 8/1966 | Angell et al. | 264/46.7 |
| 3,531,552 | 9/1970 | Getz et al. | 264/46.7 |
| 4,268,557 | 5/1981 | Bracesco | 264/46.7 |
| 4,593,449 | 6/1986 | Meray-Hovarth et al. | 29/527.1 |
| 4,923,653 | 5/1980 | Matsuura et al. | 264/46.6 |

FOREIGN PATENT DOCUMENTS

| | | |
|---|---|---|
| 0242152 | 10/1987 | European Pat. Off. . |
| 3525417A1 | 1/1987 | Fed. Rep. of Germany . |
| 2634157 | 1/1990 | France . |
| 2114051A | 8/1983 | United Kingdom . |

Primary Examiner—Robert A. Dawson
Assistant Examiner—Allan R. Kuhns
Attorney, Agent, or Firm—Nixon & Vanderhye

[57] ABSTRACT

A process for manufacturing a padded element in a mold having an upper mold and a lower mold. The process includes providing in the lower mold a cushion member with a first portion having an open recess therein, with that recess having a lower portion. The cushion member is enveloped by a trim cover having a finished upper outer surface and an inner surface. The trim cover has at least one aperture therein, and the open recess and trim cover define a cavity. The upper mold and lower mold are closed so that the upper mold is in contact with the upper outer surface of the trim cover. A liquid foamable polymeric composition is dispensed in the cavity and onto the lower surface of the open recess via the aperture in the trim cover. The polymeric composition is allowed to expand to fill substantially the cavity, and the composition comes into contact with the inner surface of the trim cover such that the first portion corresponds proportionally to the finished surface of the padded element. The expanded polymeric composition adheres to the first portion of the cushion member and to the inner surface of the trim cover.

20 Claims, 4 Drawing Sheets

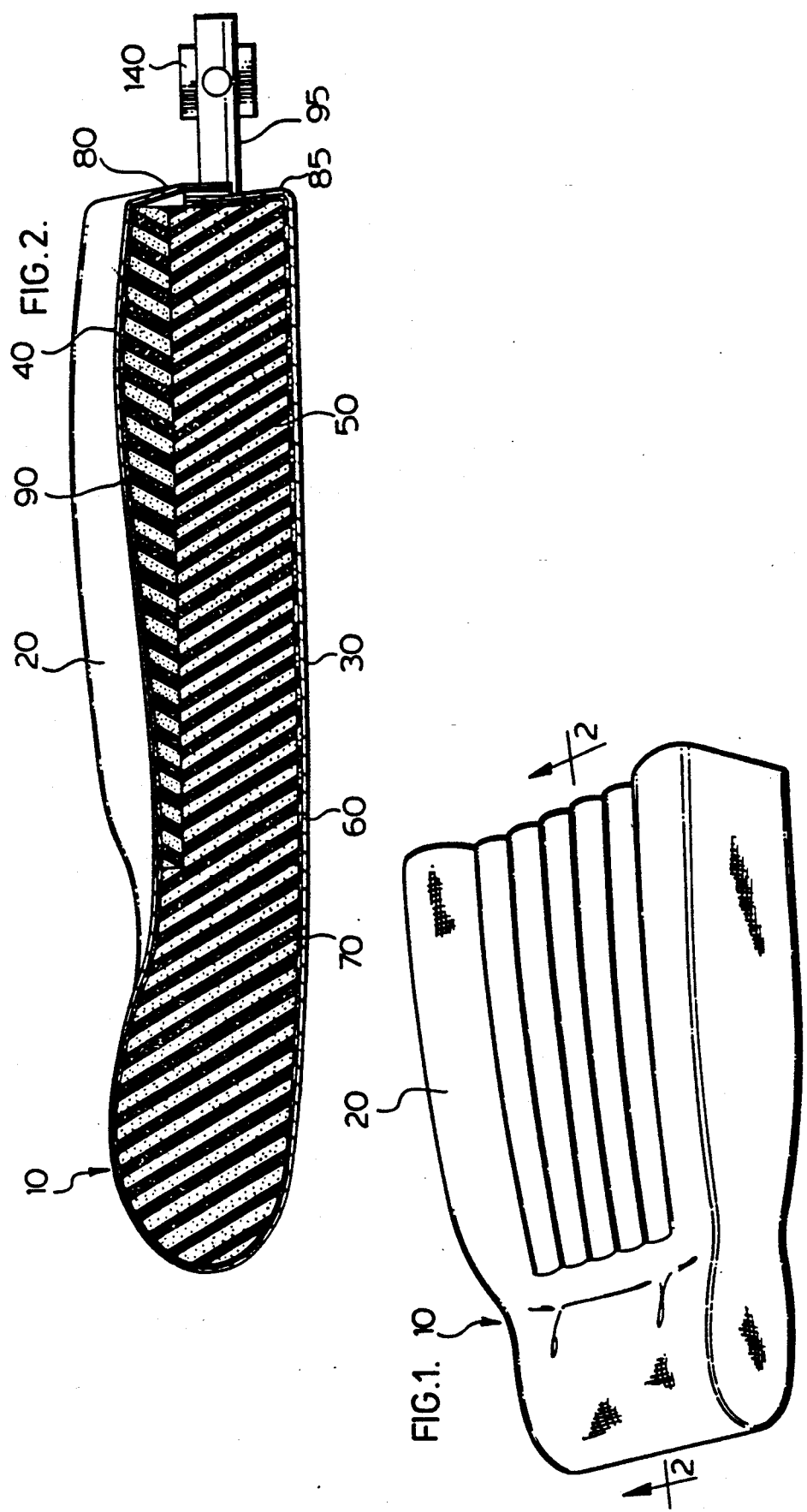

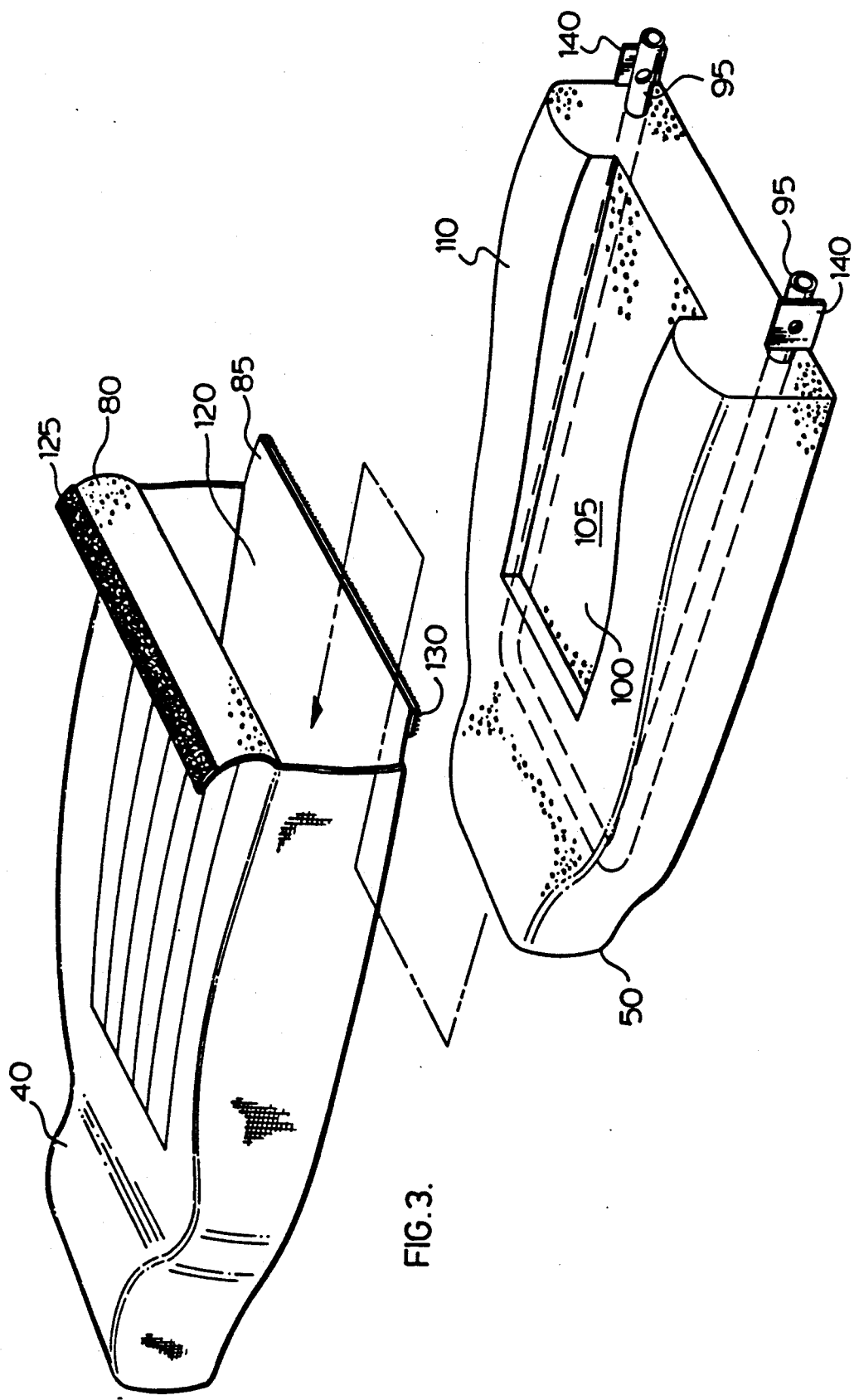

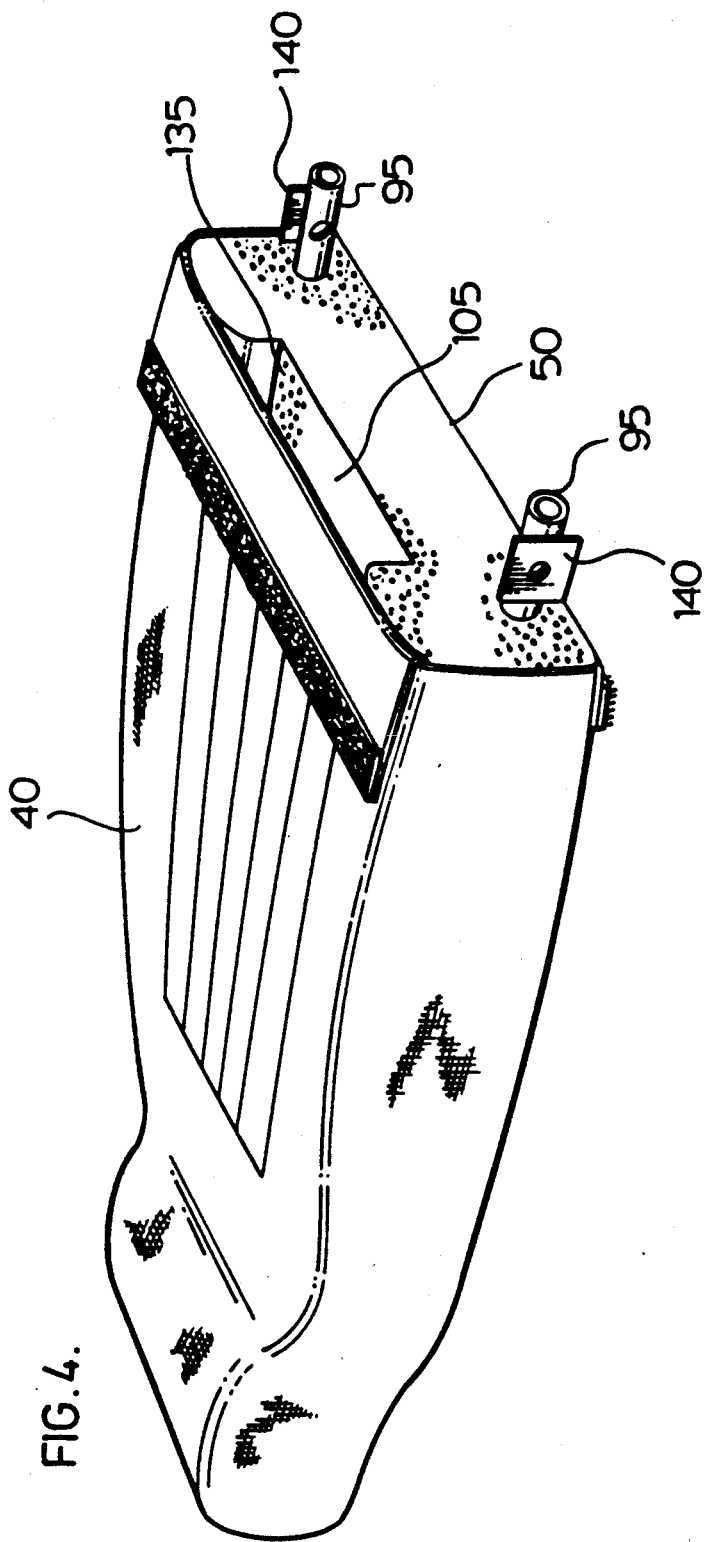

PROCESS FOR MANUFACTURING A PADDED ELEMENT

CROSS-REFERENCE TO RELATED APPLICATION

This application is a continuation-in-part of application Ser. No. 07/500,080, filed Mar. 28, 1990, now abandoned.

FIELD OF THE INVENTION

The present invention relates to a process for manufacturing a padded element. More particularly, the present invention relates to a process for manufacturing a unit-type padded element including a trim cover and a cushion member formed as a unit.

DESCRIPTION OF THE PRIOR ART

Heretofore, the methods of assembling and joining a decorative cover to the underlying padding material typically fell within one of the following techniques: mechanically retained assembly, adhesive bonded assembly and foam-in-place (also known as molded-in-place) assembly. Such assemblies have found use as, for example, vehicle seats.

In the mechanically retained assembly, the seat cover is cut and sewn to shape, and thereafter joined to the padding material by means of metal "hog rings" or "C" clips which join molded in wires in the seat pad to sewn-in-wires in the trim cover. Alternatively, the securing means could be "hook and loop" devices (commercially available under the trade name Velcro) wherein the "hook" is molded into the seat pad and the "loop" is either sewn in or laminated on to the seat cover material. Unfortunately, this mechanically retained assembly is deficient. For example, the method of manufacturing this assembly is relatively complicated in that auxiliary wires or "hooks" must be molded into the seat pad. Further, auxiliary wire pockets or loop sheeting must be sewn in or laminated on to the seat cover material. Still further, the cost of these mechanical auxiliary means is onerous when compared to the cost of the foam padding material and the seat cover material. This results in a seat which is produced in a relatively complicated manner and at a relatively high expense.

In the adhesive bonded assembly, a molded foam seat pad with the desired style and surface contours is located in a die or fixture. An adhesive in the form of a liquid, powder or film is applied to the surface of the pad. The seat cover material is held in a separate fixture and formed to the finished shape using one or more of vacuum (pressure), heat set, and steam. The seat cover material with the die fixture is then registered to the pad. Thereafter, application of heat, steam and pressure activates the adhesive and joins the seat pad to the seat cover material. This assembly is deficient in that the method of manufacturing it requires the use of external heat, steam, vacuum and relatively high pressure. Further, this assembly sometimes requires the use of a relatively expensive and toxic adhesive to bond the seat pad to the seat cover material.

In the foamed-in-place assembly, the seat cover material is located in a tool and held in place with mechanical devices and/or with application of a vacuum. An impervious barrier is applied to the underside of the cover to permit the vacuum to serve its intended function Thereafter, liquid polyurethane foam is poured into the seat cover. A sealed lid closes the mold and remains closed until the foam is set in the desired shape. As the foam expands and fills the mold, it adheres directly to the impervious barrier. This assembly is deficient in that it requires the use of external pressure and vacuum. The assembly also requires the use of an impervious backing to vacuum form the seat cover material. This backing also results in prevention of "breathing" of the finished system; this is undesirable.

In addition to the above-identified deficiencies of the prior art assemblies, extreme care must be taken when working with vinyl and with relatively exotic seat cover materials such as leather. For example, application of heat and steam to leather during the manufacturing of the assembly can permanently denature the leather thereby altering its texture and/or appearance. Further, the application of heat and steam can alter the gloss level of vinyl and also tends to wash out the grain surface.

It would be desirable to have a simple process for the manufacture of a padded element, which process could be used with virtually all conventional cover materials and which could be used to manufacture padded elements in a relatively efficient manner.

SUMMARY OF THE INVENTION

It is an object of the present invention to provide a novel process for the production of a padded element.

It is another object of the invention to provide a novel process for manufacturing a padded element using any of the conventional cover materials without damage thereof during the process.

It is yet another object of the invention to provide a novel process for manufacturing a padded element which does not require the use of external heat, steam, vacuum or relatively high pressure.

Accordingly, the present invention provides a process for manufacturing a padded element in a mold, the process comprising the steps of:

(i) providing a cushion member comprising a first portion having a cavity therein, the cushion member being enveloped by a trim cover comprising a finished outer surface and an inner surface, the trim cover having at least one aperture therein;

(ii) placing a liquid foamable polymeric composition in the cavity via the aperture of the trim cover;

(iii) allowing the polymeric composition to expand to fill substantially the cavity such that the first portion corresponds proportionally to the finished surface of the padded element;

whereby the expanded polymeric composition adheres to the cushion member and to the inner surface of the trim cover.

As used throughout the present specification, the term "cavity", when used with reference to the first portion of a cushion member, is intended to mean that the cushion member surface to be adhered to the trim cover is undersized when compared to the padded element to be formed. For example, the first portion of the cushion member, which comprises the cavity, may form a portion of the surface to be adhered to the trim cover (as illustrated hereinafter)—in this embodiment, the cushion member would also include a second portion corresponding proportionally to the finished surface of the padded element to be formed. Alternatively, the first portion of the cushion member, may form the entire surface to be adhered to the trim cover (e.g. an entire surface of the cushion member).

Thus, the present process may be used to produce padded elements without the requirement of using heat, pressure and/or steam.

In a preferred aspect of the process, the inner surface of the trim cover comprises a layer of material capable of enhancing adhesion between the trim cover and the polymeric composition after expansion of the latter. Examples of suitable such materials include a foam layer, a reticulated fabric layer and the like. Preferably, the material is a foam layer. For certain trim covers (e.g. those made of cloth), it is not necessary to have a separate layer of material.

BRIEF DESCRIPTION OF THE DRAWINGS

Embodiments of the present invention will be described with reference to the accompanying drawings in which:

FIG. 1 is a perspective view of a padded element produced in accordance with the present process;

FIG. 2 is a section along the line 2—2 in FIG. 1;

FIG. 3 is a perspective view of the trim cover and the cushion member used in the initial step of the present process;

FIG. 4 is a perspective view of the trim cover enveloping the cushion member;

DESCRIPTION OF THE PREFERRED EMBODIMENTS

Figure 5:
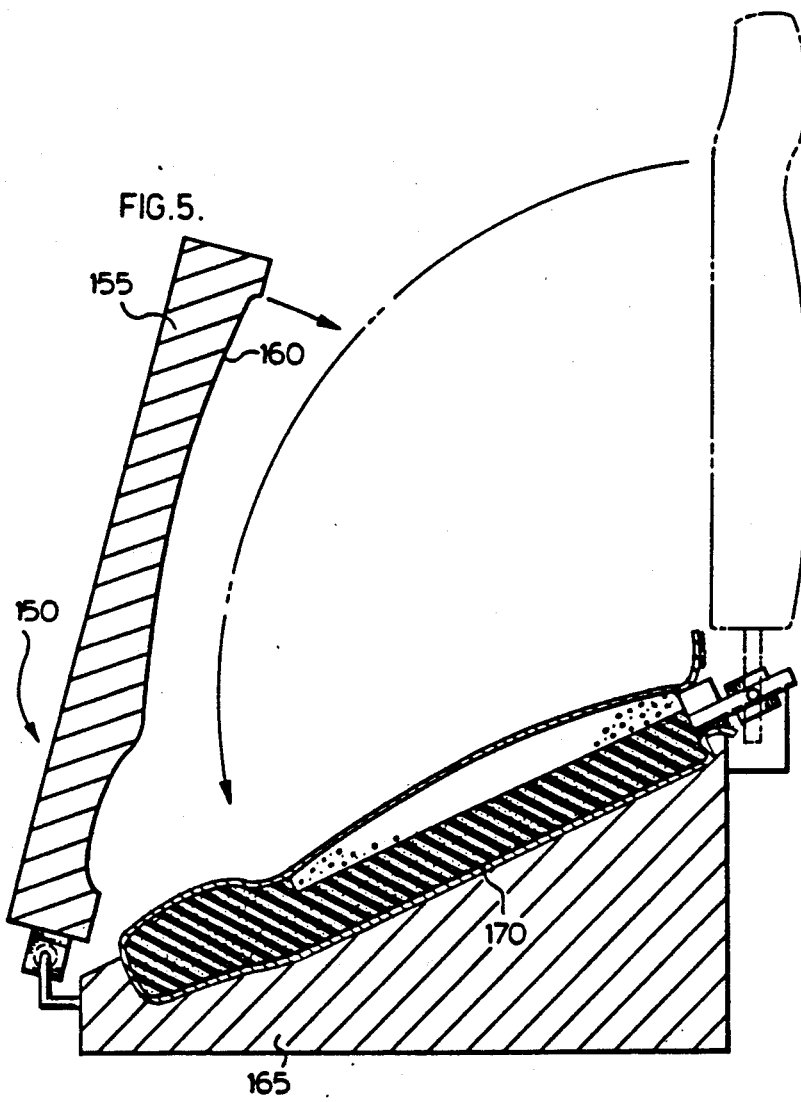
FIG. 5 is a sectional view of the trim cover/cushion member illustrated in FIG. 4 being placed in an open mold.

In my co-pending application Ser. No. 07/562,925 filed on even date herewith, there is described a process for manufacturing a padded element using a mold comprising an upper mold and a lower mold. The process comprises placing a cushion member on the lower mold. The upper surface of the cushion member includes a first portion having a cavity therein. A trim cover is placed on the upper mold. The trim cover includes a finished outer surface in contact with the interior surface of the upper mold and an inner surface. A liquid foamable polymeric composition is placed in the cavity. Thereafter, the mold is closed to enclose thereby the cavity. The foamable polymeric composition expands to fill substantially the cavity and adheres to the cushion member and to the inner surface of the trim cover. This process is particularly suited for the production of padded elements wherein one surface thereof is unfinished. For example, this process is suitable for producing the seat portion and vehicle seat systems. Such seat portions have finished upper and side surfaces. The undersurface of such seat portions are typically unfinished. Thus, the trim cover of the seat portion is adhered to the upper portion of the cushion member. Thereafter, the side portions are merely pulled over and secured beneath the seat to the frame of the car.

I have found that this process is not particularly well suited to the production of padded elements which comprise virtually all surfaces as finished surfaces and which, optionally, further comprise a rigid frame member therein. Examples of such padded elements include the backrest portion of a vehicle seat system. For such a portion of a vehicle seat system, it has been discovered that manufacture of the finished padded element may be facilitated by providing a trim cover having at least one aperture therein and enveloping the cushion member. The liquid foamable polymeric composition is then placed in the cavity in the cushion member via the aperture in the trim cover.

With reference to FIGS. 1 and 2, there is illustrated a padded element in the form of a backrest 10 produced in accordance with the present process. Backrest 10 comprises an upper surface 20 and a lower surface 30. Backrest 10 further comprises a trim cover 40 and a cushion member 50. Trim cover 40 includes a finished outer surface 60, an inner surface comprising foam layer 70 and end panels 80 and 85. Adhering trim cover 40 to cushion member 50 is a foam member 90. Cushion member 50 encases a rigid frame member 95. The production of foam member 90 will be described in more detail hereinafter.

With reference to FIG. 3, there is illustrated a mode of placing cushion member 50 in trim cover 40. Cushion member 50 comprises a first portion 100 having a cavity 105 therein and a second portion 110 corresponding proportionally to upper surface 20 of backrest 10. By "proportionally" it is meant that, with the exception of first portion 100, the upper surface of cushion member 50 corresponds to upper surface 20 of backrest 10 (i.e. the backrest to be formed). As illustrated by the broken lines in cushion member 50, rigid frame member 95 follows the periphery of first portion 100 and is encased by cushion member 50.

Trim cover 40 comprises an aperture 120 through which cushion member 50 is inserted. Flap 80 of trim cover 40 comprises a row of hooks 125 on the inner surface thereof. Flap 85 comprises a row of loops 130 on the outer surface thereof.

With reference to FIG. 4, there is illustrated unit 37 including trim cover 40 enveloping cushion member 50. A portion 135 of aperture 120 in trim cover 40 is exposed permitting access to cavity 105 of cushion member 50.

With reference to FIG. 5, there is illustrated a mold 150 suitable for use in the present process. Mold 150 comprises an upper mold 155 having an inner surface 160 corresponding to upper surface 20 of the backrest to be formed. Mold 150 further comprises a lower mold 165 having an inner surface 170 corresponding substantially to the lower surface 30 of backrest 10 to be formed.

With further reference to FIG. 5, after unit 37 has been mounted to lower mold 165, the mounted unit 37 is pivoted such that lower surface 30 is in contact with inner surface 170 of lower mold 165. Thereafter, upper mold 155 is pivoted such that inner surface 160 is in contact with upper surface 20.

Figure 6:
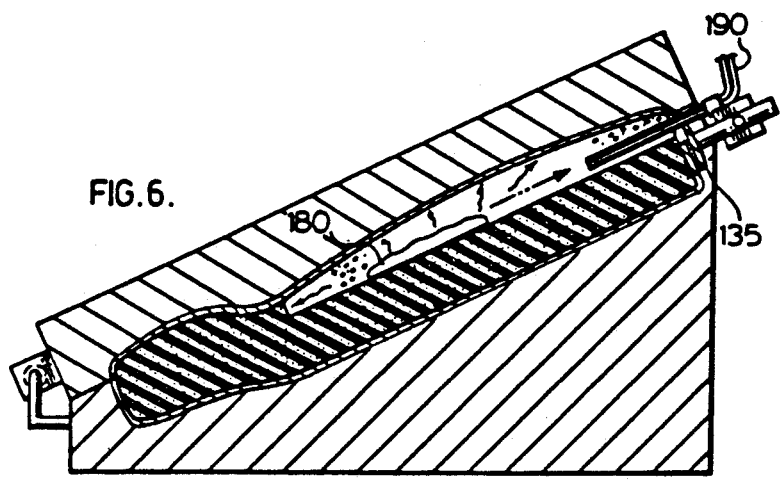
FIG. 6 is a sectional view of the mold illustrated in FIG. 5 in a closed position and illustrating introduction of the foamable composition into the cavity of the cushion member.

With reference to FIG. 6, a liquid foamable polymeric composition 180 is dispensed from a suitable dispensing means 190 via aperture 135 onto the lower surface of cavity 105. After composition 180 has been dispensed in cavity 105, dispensing means 190 is withdrawn from cavity 105 and aperture 135 is blocked by any suitable means (not shown). Thereafter, foamable composition 180 expands to fill completely cavity 105 thereby forming foam member 90 illustrated in FIG. 2. As illustrated in FIGS. 5 and 6, backrest 10 to be formed may be suitably inclined to assist in dispensing of foamable polymeric composition 180 in cavity 105.

After liquid foamable polymeric composition 180 has expanded and cured, upper mold 155 may be pivoted upward from lower mold 165. Finished backrest 10 may then be removed from lower mold 165, and thereafter flaps 80 and 85 may closed and fastened to one another by hooks 125 and loops 130 to provide backrest 10 illustrated in FIGS. 1 and 2.

The form of liquid foamable polymeric compositions suitable for use in the present process and the manner by which it is dispensed into the cavity of the cushion member is not particularly restricted. Preferably, the foamable polymeric composition comprises a polyurethane. More preferably, the polyurethane is a diphenylmethane diisocyanate (MDI)-based system of low index and of a high molecular weight conventional polyol. Such a system is typically completely "water blown" using highly-catalyzed odorless amines and a cell regulator. Typically, this system cures at room temperature in about three minutes or less.

The present process can be used to manufacture a variety of padded elements. Non-limiting examples of such padded elements include: components of vehicle seats such as the seat cushion, the backrest and the headrest; components of other types of seat systems such as those used in boats, snowmobiles, and in office furniture; pillar covers; and padded interior door and quarter trim panels in vehicles.

Further, the present process can be used with virtually all conventional trim cover materials. Nonlimiting examples of such materials include leather, vinyl and cloth. Preferably, the inner surface of the trim cover includes a foam layer made of polyurethane foam to enhance adhesion between the trim cover and the liquid foamable polymeric composition.

The present process can be used with virtually any cushion member which is made from a resilient material. The preferred foam cushion member is made from a polymer foam, more preferably polyurethane foam. Alternatively, the cushion member may be made from horsehair or coconut fibers which are resin-filled, or from cotton or jute.

In the most preferred embodiment of the present process, each of the foam layer (when present) of the inner surface of the trim cover, the cushion member and the foamable polymeric composition comprises polyurethane.

Thus, the present process can be used to produce a padded element in a convenient and efficient manner. There is no requirement to use high temperature, pressure, vacuum or steam during the present process as there is with the prior art processes discussed hereinabove.

What is claimed is:

1. A process for manufacturing a padded element in a mold having an upper mold and a lower mold, the process comprising the steps of:
   (i) providing in said lower mold a cushion member comprising a first portion having an open recess therein, said open recess having a lower surface, the cushion member being enveloped by a trim cover comprising a finished upper outer surface and an inner surface, the trim cover having at least one aperture therein, said open recess and trim cover defining a cavity;
   (ii) closing said upper mold and said lower mold so that said upper mold is in contact with the upper outer surface of said trim cover;
   (iii) dispensing a liquid foamable polymeric composition in said cavity and onto said lower surface of said open recess via the aperture in the trim cover; and
   (iv) then allowing the polymeric composition to expand to fill substantially the cavity and come into contact with said inner surface of said trim cover such that the first portion corresponds proportionally to the finished surface of the padded element, the expanded polymeric composition adhering to the first portion of the cushion member and to the inner surface of the trim cover.

2. The process defined in claim 1, wherein said cushion member further comprises a second portion corresponding proportionally to the finished surface of the padded element.

3. The process defined in claim 1, wherein the inner surface of the trim cover comprises a layer of material capable of enhancing adhesion between the trim cover and the polymeric composition.

4. The process defined in claim 3, wherein said material is a foam layer.

5. The process defined in claim 3, wherein said material is a reticulated fabric.

6. The process defined in claim 1, wherein the finished upper surface of said trim cover is made of leather.

7. The process defined in claim 1, wherein the finished upper surface of said trim cover is made of vinyl.

8. The process defined in claim 1, wherein the finished upper surface of said trim cover is made of cloth.

9. The process defined in claim 4, wherein the foam layer comprises a polyurethane foam.

10. The process defined in claim 1, wherein said cushion member comprises a polyurethane foam.

11. The process defined in claim 1, wherein said foamable polymeric composition comprises polyurethane.

12. The process defined in claim 4, wherein each of the foam layer, said cushion member and said foamable polymeric composition comprises polyurethane.

13. The process defined in claim 12, wherein the padded element is a component of a vehicle seat.

14. The process defined in claim 13, wherein said component is a seat cushion.

15. The process defined in claim 13, wherein said component is a backrest.

16. The process defined in claim 1, wherein said cushion member encases a rigid frame member.

17. The process defined in claim 16, wherein said cushion member comprises a polyurethane foam.

18. The process defined in claim 17, wherein said cushion member is a backrest of a vehicle seat.

19. The process defined in claim 1, wherein the padded element is a component of a seat system.

20. A process for manufacturing a back rest of a seat system in a mold having an upper mold and a lower mold, the process comprising the steps of:
   (i) providing in said lower mold a polyurethane cushion member encasing a rigid frame member, said cushion member comprising a first portion having an open recess therein and a second portion corresponding proportionally to the finished surface of the padded element to be formed, said open recess having a lower surface, the cushion member being enveloped by a trim cover comprising a finished upper outer surface and an inner surface comprising a polyurethane foam layer, the trim cover having at least one aperture therein, said open recess and trim cover defining a cavity;

(ii) closing said upper mold and said lower mold so that said upper mold is in contact with the upper outer surface of said trim cover;

(iii) dispensing a liquid foamable polyurethane composition in the cavity and onto to said lower surface of said open recess via the aperture of the trim cover; and (iv) then allowing the polyurethane composition to expand to fill substantially the cavity and come into contact with said inner surface of said trim cover such that the first portion corresponds proportionally to the finished surface of the back rest, the expanded polyurethane composition adhering to the first portion of the cushion member and to the polyurethane foam layer of the trim cover.

* * * * *